United States Patent
Ryu

(10) Patent No.: US 11,308,519 B2
(45) Date of Patent: Apr. 19, 2022

(54) APPARATUS AND METHOD FOR MOVING ADVERTISEMENT

(71) Applicant: Jonghyun Ryu, Goyang-si (KR)

(72) Inventor: Jonghyun Ryu, Goyang-si (KR)

( * ) Notice: Subject to any disclaimer, the term of this patent is extended or adjusted under 35 U.S.C. 154(b) by 225 days.

(21) Appl. No.: 16/477,856

(22) PCT Filed: Aug. 16, 2018

(86) PCT No.: PCT/KR2018/009366
§ 371 (c)(1),
(2) Date: Jul. 12, 2019

(87) PCT Pub. No.: WO2019/045330
PCT Pub. Date: Mar. 7, 2019

(65) Prior Publication Data
US 2020/0058054 A1 Feb. 20, 2020

(30) Foreign Application Priority Data
Aug. 28, 2017 (KR) .......................... 10-2017-0108423

(51) Int. Cl.
*G06Q 30/02* (2012.01)
*H04W 4/23* (2018.01)
(Continued)

(52) U.S. Cl.
CPC .......... *G06Q 30/0265* (2013.01); *G01S 19/13* (2013.01); *G06Q 30/0267* (2013.01);
(Continued)

(58) Field of Classification Search
CPC . G06Q 30/0265; G06Q 30/0267; H04W 4/23; H04W 76/10; H04W 4/40;
(Continued)

(56) References Cited

U.S. PATENT DOCUMENTS

| | | | |
|---|---|---|---|
| 2003/0006911 A1* | 1/2003 | Smith | G08G 1/20 340/988 |
| 2010/0036739 A2* | 2/2010 | Barlow | G06Q 30/02 705/14.62 |

(Continued)

FOREIGN PATENT DOCUMENTS

| | | |
|---|---|---|
| KR | 10-2005-0031119 A | 4/2005 |
| KR | 10-2012-0040518 A | 4/2012 |

(Continued)

OTHER PUBLICATIONS

Ahmad Alhilal Distributed Vehicular Computing at the Dawn of 5G: a Survey, , p. 4 and 5, Jan. 2020 (Year: 2020).*
(Continued)

*Primary Examiner* — Abhishek Vyas
*Assistant Examiner* — Darnell A Pouncil

(57) ABSTRACT

A housing provided with an advertisement display is mounted on a vehicle or a user's article or a user's body; a local communication unit or the like is provided in the housing; and the local communication unit, the mobile terminal are wirelessly connected to each other and the GPS is activated, and the mobile terminal transmits transmission and reception information and location and speed information to the server when the mobile terminal in possession of the user approaches the housing.

8 Claims, 6 Drawing Sheets

(51) Int. Cl.
*H04W 76/10* (2018.01)
*G01S 19/13* (2010.01)
*G09F 21/04* (2006.01)

(52) U.S. Cl.
CPC .............. *G09F 21/04* (2013.01); *H04W 4/23* (2018.02); *H04W 76/10* (2018.02)

(58) Field of Classification Search
CPC ...... H04W 4/027; G01S 19/13; G01S 5/0027; H04N 21/41; H04N 21/4122; H04N 21/4126; G09F 19/18; G09F 21/04; G09F 21/048
See application file for complete search history.

(56) References Cited

U.S. PATENT DOCUMENTS

| | | | | |
|---|---|---|---|---|
| 2013/0013412 A1* | 1/2013 | Altman | .................. | G06Q 30/02 705/14.61 |
| 2016/0098756 A1* | 4/2016 | Ayre | ..................... | G09F 21/048 705/14.63 |

FOREIGN PATENT DOCUMENTS

| | | |
|---|---|---|
| KR | 10-2012-0052150 A | 5/2012 |
| KR | 10-1145412 B1 | 5/2012 |
| KR | 10-2014-0052424 A | 5/2014 |

OTHER PUBLICATIONS

PCT International Search Report dated Dec. 13, 2018 by WIPO.
PCT Written Opinion dated Dec. 13, 2018 by WIPO.

\* cited by examiner

APPARATUS AND METHOD FOR MOVING ADVERTISEMENT

CROSS REFERENCE TO RELATED APPLICATIONS

This application is a continuation of International Application No. PCT/KR2018/009366 filed on Aug. 16, 2018, which claims priority to Korean Application No. 10-2017-0108423 filed on Aug. 28, 2017, the entire contents of which are herein incorporated by reference in its entirety.

TECHNICAL FIELD

The present invention provides an apparatus and a method for displaying an advertisement by mounting a housing, which is equipped with an advertisement display unit, on a vehicle, a user's article, or a user body.

TECHNICAL BACKGROUND

Conventionally, an advertisement is exposed to the people using an advertisement billboard. The billboard is installed on the outside of a vehicle such as a taxi or a bus using an adhesive sheet or displayed on a street by a service contractor who is employed under an advertisement service contract. However, it is difficult to measure how effective the advertisement is since the time when and the area where the advertisement is exposed are unknown. Thus, it is difficult to properly calculate advertising service fees.

An advertisement image may be received through wireless internet connection and shown on an internal monitor installed in a vehicle such as a bus. However, for this method, a network transmission and reception terminal should be installed. Thus, an overhead cost is high.

It is difficult to monitor how sincerely a vehicle driver or the advertisement service contractor is performing his duty as scheduled or requested by an advertiser. For example, the vehicle driver or the advertisement service contractor may remove the advertisement billboards intentionally without permission. In another instance, no advertisement is exposed because an advertisement device malfunctions or is out of order. Nevertheless, advertisers may need to pay advertisement service fees since there is no way to remotely monitor such misconducts or events.

Even when the advertisement display unit is normally installed or normally operates, no advertisement may be exposed to the public. This may happen, for example, when the vehicle is parked at an underground parking lot. The conventional art cannot monitor such situation.

DETAILED DESCRIPTION OF THE INVENTION

Problems to be Solved

An objective of the present invention is to provide an apparatus and a method for displaying an advertisement on a vehicle, a user's article, or a user body. It is possible to monitor whether advertisement exposure is interrupted by damage to the display unit, separation of the display unit from the vehicle, or a system failure. Such damage, separation, or system failure may be caused intentionally by a user or accidentally. That is, the present invention provides an apparatus and a method for remotely monitoring using a mobile terminal whether advertisement is normally exposed.

Another objective of the present invention is to provide an apparatus and a method for exposing an advertisement to the public while a vehicle is moving with a display unit mounted on the vehicle, a user's article, or a user's body.

Another objective of the present invention is to provide an apparatus and a method for calculating advertisement service fees using location information obtained from a GPS unit of a mobile terminal. The mobile terminal is connected to a moving advertisement apparatus.

Another objective of the present invention is to provide an apparatus and a method for calculating advertisement service fees differently depending on whether the advertisement device operates normally and where the advertisement device is located.

Another objective of the present invention is to provide a method and an apparatus for determining whether a vehicle advertisement display unit operates normally using a mobile terminal owned by a vehicle user and measuring the advertisement effect through GPS of the mobile terminal. An advertisement cost can be saved since no additional device is required other than the mobile terminal.

Another objective of the present invention is to provide an apparatus and a method for transmitting and receiving image data using the mobile terminal to display an advertisement image. An advertisement cost can be saved since no additional device is required.

SUMMARY OF INVENTION

A moving advertisement apparatus includes the followings: a housing having an advertisement display unit, wherein the advertisement display unit displays an advertisement; a mounting unit provided on at least one side of the housing and mounting the housing on at least one of a vehicle, a user's article, and a user's body; a local communication unit coupled with the housing and wirelessly exchanging transmission and reception information with a mobile terminal in possession of a user when the user approaches the housing; an electric power supply unit coupled with the housing and supplying electric power to at least one of the local communication unit and the advertisement display unit; a GPS unit provided in the mobile terminal and obtaining location and moving speed information of the mobile terminal; and a server establishing a network connection with the mobile terminal when the mobile terminal is wirelessly connected to the local communication unit and receiving the transmission and reception information exchanged between the mobile terminal and the local communication unit and the location and moving speed information obtained from the GPS unit via the mobile terminal.

The moving advertisement apparatus may further include; a separation preventing unit which disconnects the local communication unit from the mobile terminal when the local communication unit is separated from the housing. The moving advertisement apparatus may further include; a mounting sensing unit sensing whether die mounting unit is normally operating and informing the local communication unit of whether the mounting unit is normally operating.

The server further calculates an advertisement service fee based on at least one of die transmission and reception information and the location and moving speed information which are received front the mobile terminal. The server further transmits the advertisement service fee calculated to the mobile terminal. The server transmits advertisement data to the mobile terminal. The mobile terminal transmits the advertisement data to die local communication unit. The advertisement display unit, which is connected to the local communication unit, displays an advertisement.

The server attempts to establish a network connection with the mobile terminal when the mobile terminal is wirelessly connected to the local area communication unit. The network connection between the mobile terminal and the server is terminated when a network connection between the mobile terminal and the local area communication.

A moving advertisement method according to an embodiment of the present application includes the followings: (a) a step of establishing a wireless network connection between a mobile terminal and a local communication unit and generating transmission and reception information when the mobile terminal in possession of a user approaches a housing, wherein the housing is provided with an advertisement display unit and the local communication unit, wherein the advertisement display unit is designed to display an advertisement; (b) a step of establishing a wireless network connection between the mobile terminal and a server and transmitting the transmission and reception information from the mobile terminal to the server; and (c) a step of obtaining location and moving speed information of the mobile terminal from a GPS unit of the mobile terminal and transmitting the location and moving speed information from the mobile terminal to the server when the user is moving and the mobile terminal is moving which is in possession of the user and connected to die local communication unit. The method further includes: (d) a step of calculating an advertisement service fee by the server based on at least one of the transmission and reception information and the location and moving speed information.

The method may further include: a step of transmitting the advertisement service fee from the server to the mobile terminal. The method may further include: a step of terminating a network connection between the mobile terminal and the server when the mobile terminal in possession of the user is disconnected from the local communication unit. The mobile terminal, which is wirelessly connected to the local communication unit, is disconnected from the local communication unit when the user is away from the housing.

The method may further include, before step (c), a step of transmitting advertisement image data from the server via the mobile terminal to die local communication unit and displaying an advertisement on the advertisement display unit connected with the local communication unit.

ADVANTAGES OF THE INVENTION

An embodiment of the present invention provides an apparatus and a method for displaying an advertisement on a vehicle, a user's article, or a user body and remotely monitoring using a user's mobile terminal whether advertisement normally operates. It is possible to monitor whether advertisement exposure is interrupted due to damage to the display unit, separation of the display unit from the vehicle, or a system failure. Such damage, separation, or system failure may be caused intentionally by the user or accidentally.

An embodiment of the present invention may provide an apparatus and a method for remotely monitoring whether a moving advertisement device is normally installed on a vehicle, a user's article, or a user's body. This may enhance the possibility that an advertisement is normally displayed and exposed to more number of public.

An embodiment of the present invention may provide an apparatus and a method for calculating advertisement service fees through the mobile terminal which is connected to a moving advertisement device. The advertisement service fees may be different depending on whether the moving advertisement device operates normally, where the advertisement is being displayed, and when the advertisement is being displayed.

According to an embodiment of the present invention, whether the mobile advertisement unit is installed and whether the advertisement display unit operates normally are monitored through the mobile terminal in possession of the user. The advertisement effect is measured using a GPS of the mobile terminal. No additional device is necessary other than the user's mobile terminal. Thus, an apparatus and a method according to an embodiment of the present invention can be embodied simple and cost-effective.

When it is necessary to display advertisement images, the mobile terminal may be used for transmission and reception of image data. Thus, no additional device is required for embodying an apparatus and a method according to the present application.

According to an embodiment of the present invention, a network connection between the mobile terminal and the server is established only when a wireless connection between the local communication unit and the mobile terminal is established. Thus, data communication fees of the mobile terminal can be saved and personal information can be more securely protected.

EMBODIMENTS

Figure 1:
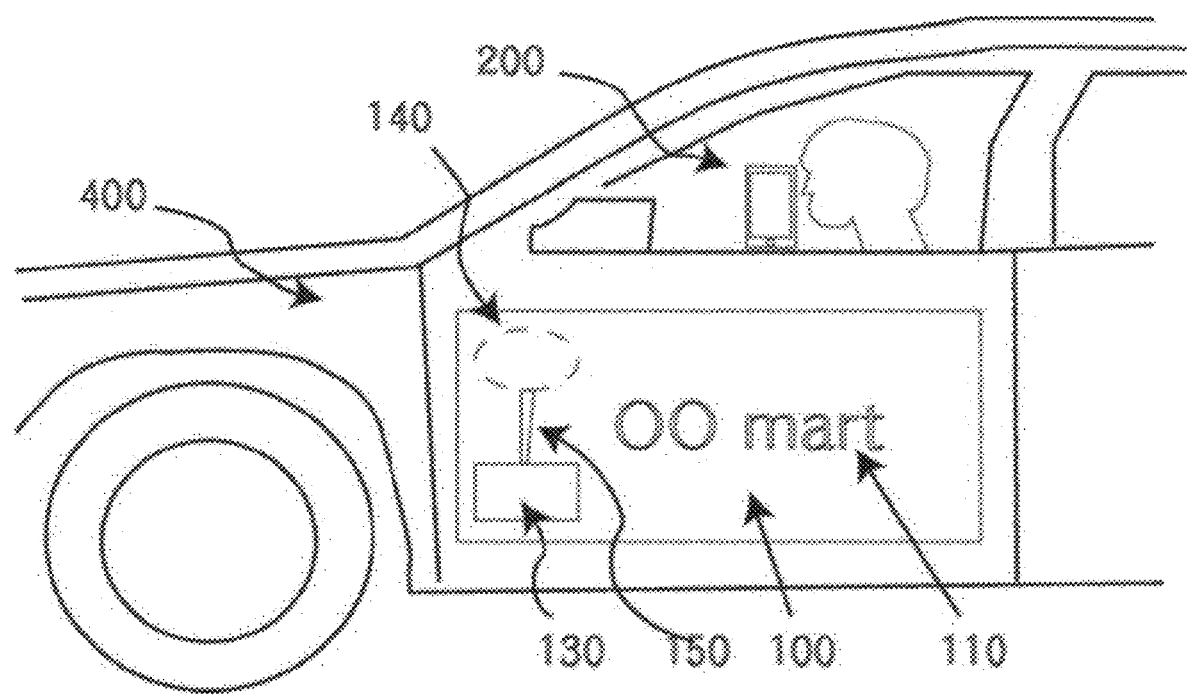
FIG. 1 is a diagram illustrating a moving advertisement apparatus according to a first embodiment of the present invention.
Figure 2:
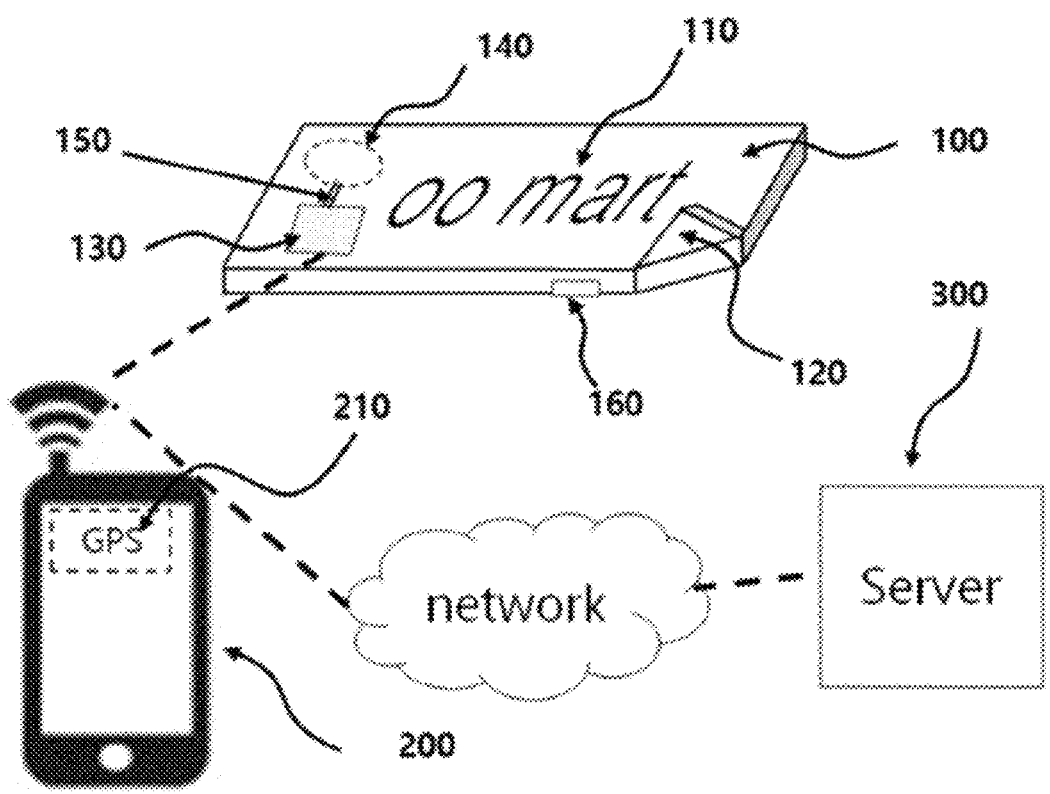
FIG. 2 is a diagram illustrating an operating system of a moving advertisement apparatus according to the first embodiment of the present invention.

Hereinafter, preferred embodiments of the present invention will be described with reference to the accompanying drawings. FIG. 1 is a diagram illustrating a moving advertisement apparatus according to a first embodiment of the present invention. FIG. 2 is a diagram illustrating an operating system of a moving advertisement apparatus according to die first embodiment of the present invention.

Referring to FIGS. 1 and 2, a housing (100) is provided with an advertisement display unit (110) displaying an advertisement. The housing (100) is made of metal or non-metal. The advertisement display unit (110) displays an advertisement. The advertisement may be images, texts, video including audio, a projection, a hologram, a beam, a laser beam, moving pictures, etc., but not limited thereto.

The housing (100) has a mounting unit (120) installed on a vehicle (400). The mounting unit (120) can be detachably attached to or fixed to inside or outside of the vehicle (400). The installation may be made permanent or semi-permanent, for example, using bolts, nuts, adhesives, or the like. In another embodiment, the installation may be made detachable, for example, using magnetic material, but not limited thereto.

The housing (100) is provided with a local communication unit (130). The local communication unit (130) is a communication technology for wirelessly exchanging various data within a short distance. It includes NFC (Near Field Communication), Bluetooth, beacon, RFID tag, and the like, but is not limited thereto.

The housing (100) is provided with an electric power supply unit (140) for supplying electric power to the local communication unit (130) or the advertisement display unit (110). The electric power supply unit (140) may be a solar cell, batteries, generators, etc. A separation prevention unit (150) is also provided in the housing 100. The separation prevention unit (150) stops the local communication unit (130) from working when the local communication unit (130) is damaged or when the local communication unit (130) is separated from the housing (100).

A mounting sensing unit (160) is also provided in the housing (100) to sense whether the housing (100) is mounted on or detached from the vehicle (400). For example, when the housing (100) is detached from the vehicle (400), the mounting detection unit (160) may sense it either by itself or in conjunction with the local communication unit (130) or the electric power supply unit (140). When a user is in the vehicle (400), at least one mobile terminal (200) in possession of the user, which is located close to the housing (100), is wirelessly connected with the local area communication unit (130) of the housing (100) for transmission reception operation.

The mobile terminal (200) refers to a mobile terminal at least equipped with a communication module and a GPS module. A typical example is a smartphone in the current technology. When the vehicle (400) travels with the housing (100) mounted thereon, the transmission and reception information exchanged between (the mobile terminal (200) and the local communication unit (130) and information on location and moving speed information obtained from a GPS unit (210) of the mobile terminal (200) are transmitted from the mobile terminal (200) to the server (300). Based on this information, the server (300) determines whether the vehicle (400) is running with the housing (100) mounted thereon and calculates advertisement service fees based on the transmission and reception information and the location and moving speed information.

When the vehicle (400) travels without installing the advertisement device, no transmission/reception information, which is generated between the mobile terminal (200) and the local communication unit (130), is transmitted to the server (300). The location and moving speed information alone is transmitted from the GPS unit (210) of the mobile terminal (200) to the server (300). In this case, no advertisement service fee is calculated. Here, the GPS unit (210) refers to a global positioning system. Information on current time, accurate location, and a moving speed can be obtained through the GPS unit. The server (300) can calculate the advertisement service fees differently based on the transmission and reception information and the location and moving speed information.

For example, when the housing (100) is not installed on the vehicle (400), the advertisement display unit (110) fails to work. When the housing (100) is hidden in a trunk of the vehicle (400), the advertisement display unit (110) is not exposed. To handle those situations, the housing (100) may further include the mounting sensing unit (160). The mounting sensing unit (160) detects whether the housing (100) is not mounted on the vehicle (400) and whether the advertisement display unit (110) is not properly working. Such information is provided to the server (300) by being carried on the transmission and reception information which is exchanged between the mobile terminal and the local communication unit (130). Based on the information, the server (300) decides not to calculate the advertisement service fee or determines the fee as zero.

In another instance, the user may not want to install the housing (100) on the vehicle (400). The user may intentionally separate the housing (100) from the local communication unit (130) and run the vehicle (400) with having the local communication unit (130) and the mobile terminal (200) equipped, but not having the housing (100) equipped. In this instance, a separation prevention unit (150) may be further provided to inform the server (300) of the fact that the vehicle (400) running without the housing (100). The separation prevention unit (150) may disable a wireless connection between the local communication unit (130) and the mobile terminal (200) and deactivate the local communication unit (130) when the local communication unit (130) is separated from the housing (100).

The server (300) can calculate the advertising service fees differently depending on where the vehicle (400) is traveling with having the housing (100) equipped and if the area is where desired by an advertiser. The server (300) may calculate the advertisement service fees differently depending on where the vehicle is parking with the housing (100) installed. That is, the server (300) can calculate the advertisement service fees differently depending on whether the wireless connection is maintained. Whether the wireless connection is maintained can be determined based on the transmission and reception information and the location and moving speed information.

When the transmission and reception information and the location and moving speed information are no longer received by the server (300), and when the moving speed obtained from the GIP unit (210) indicates zero, the server (300) determines that the vehicle (400) is parked and the user of the vehicle (400) left the vehicle (400). The transmission and reception information is exchanged between the mobile terminal (200) and the local communication unit (130) provided in the housing (100). The location and moving speed information is obtained from the GPS unit (210).

When the user of the vehicle (400) leaves the vehicle (400) and the vehicle is parked, the server (300) may differently calculate the advertisement fees by the advertisement display unit (110) installed on the housing (100) depending on where the vehicle (400) is parked. That is, the server (300) may calculate the advertisement service fees differently depending on the parking location, e.g., whether it is an underground parking lot, whether it is a main street crowded with people, and the like.

The server (300) transmits the amount of the advertisement service fees to the mobile terminal (200) and informs the user of how much the advertisement service fees is earned. When the user is in the vehicle (400), the mobile terminal (200) in possession of the user of the vehicle (400) is connected to the local communication unit (130) provided in the housing (100), and subsequently the mobile terminal (200) is connected to the server (300). When the user leaves the vehicle (400), the mobile terminal (200) in possession of the user of the vehicle (400) is disconnected from the local communication unit (130). Once the user leaves the vehicle (400), the location and moving speed information are no longer necessary. Thus, the connection between the mobile terminal (200) and the server (300) is terminated. That is, the information required is the location and the moving speed of the housing (100) mounted on the vehicle (400), but not the location of the user.

Once the user leaves the vehicle (400), the user's location is privacy and needs to be protected. Thus, when the user leaves the vehicle (400), the connection between the mobile terminal (200) and the mobile terminal (200) of the user of the vehicle (400) is terminated.

Figure 3:
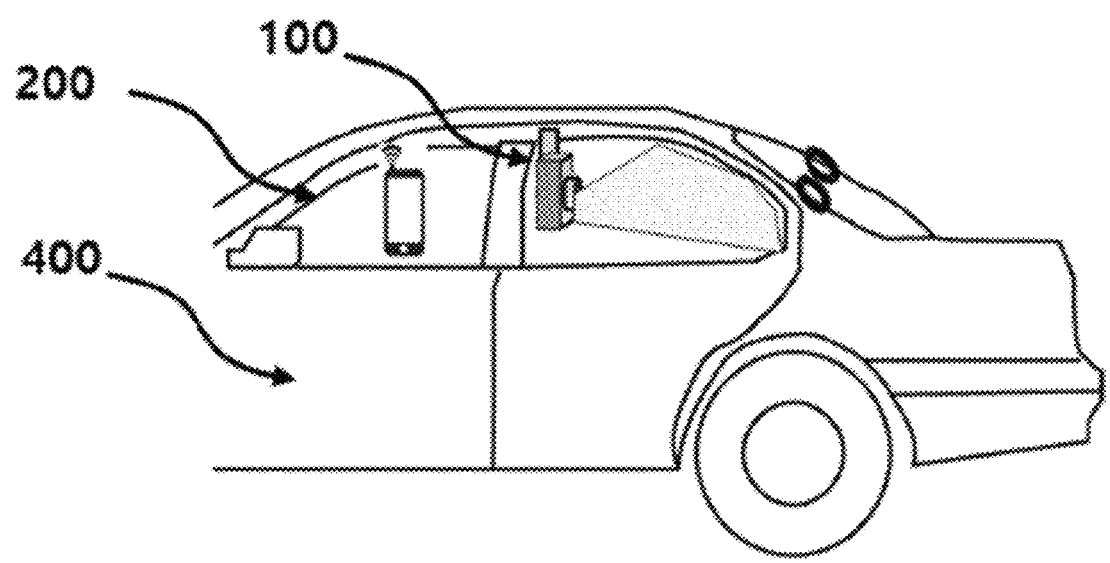
FIG. 3 is a diagram illustrating a moving advertisement apparatus according to a second embodiment of the present invention.
Figure 4:
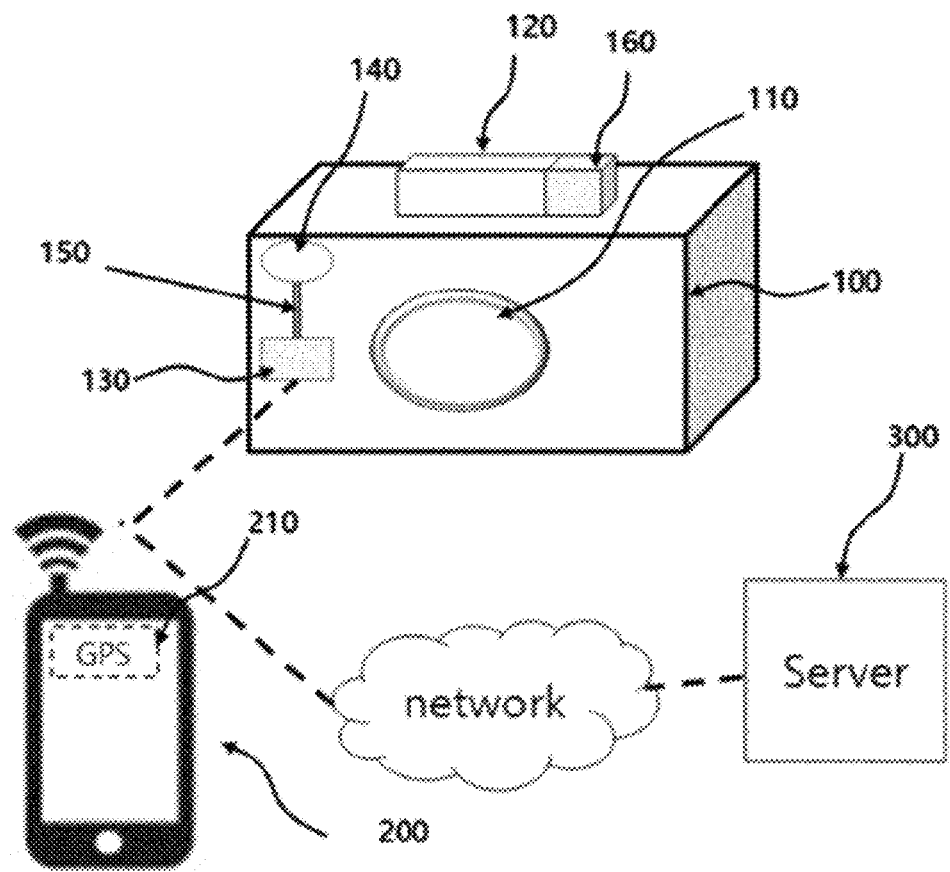
FIG. 4 is a diagram illustrating an operating system of a moving advertisement apparatus according to the second embodiment of the present invention.

FIG. 3 is a diagram illustrating a mobile advertisement apparatus according to a second embodiment of the present invention. FIG. 4 is a diagram illustrating an operating system of a mobile advertisement apparatus according to the second embodiment of the present invention. As to the elements shown in FIG. 3 and FIG. 4, their functions have been described above with reference to FIGS. 1 and 2. Thus, they will not be repeated hereinafter. Description below is given with reference to FIGS. 3 and 4.

The server (300) may transmit advertisement image data to the local communication unit (130) via the mobile terminal (200), thereby displaying an advertisement on the advertisement display unit (110). The advertisement may be displayed, for example, on a window of the vehicle (400) by projection. The location may be the vehicle body or another object other than the vehicle (400), but not limited thereto.

The advertisement image data may be transmitted to the local communication unit (130) via the mobile terminal (200) for being exposed. However, in another embodiment, the advertisement is exposed using a fixed or a semi-permanent advertisement display device, instead of transmitting the advertisement image data. In that case, there is no need to transmit the advertisement image data. Therefore, the advertisement image data may or may not be transmitted depending on what kind of display device is employed. In the case where the advertisement image data is transmitted, the advertisement display unit (110) may include, but not limited to, a monitor, a beam projector, and the like which is capable of displaying the advertisement image.

Figure 5:
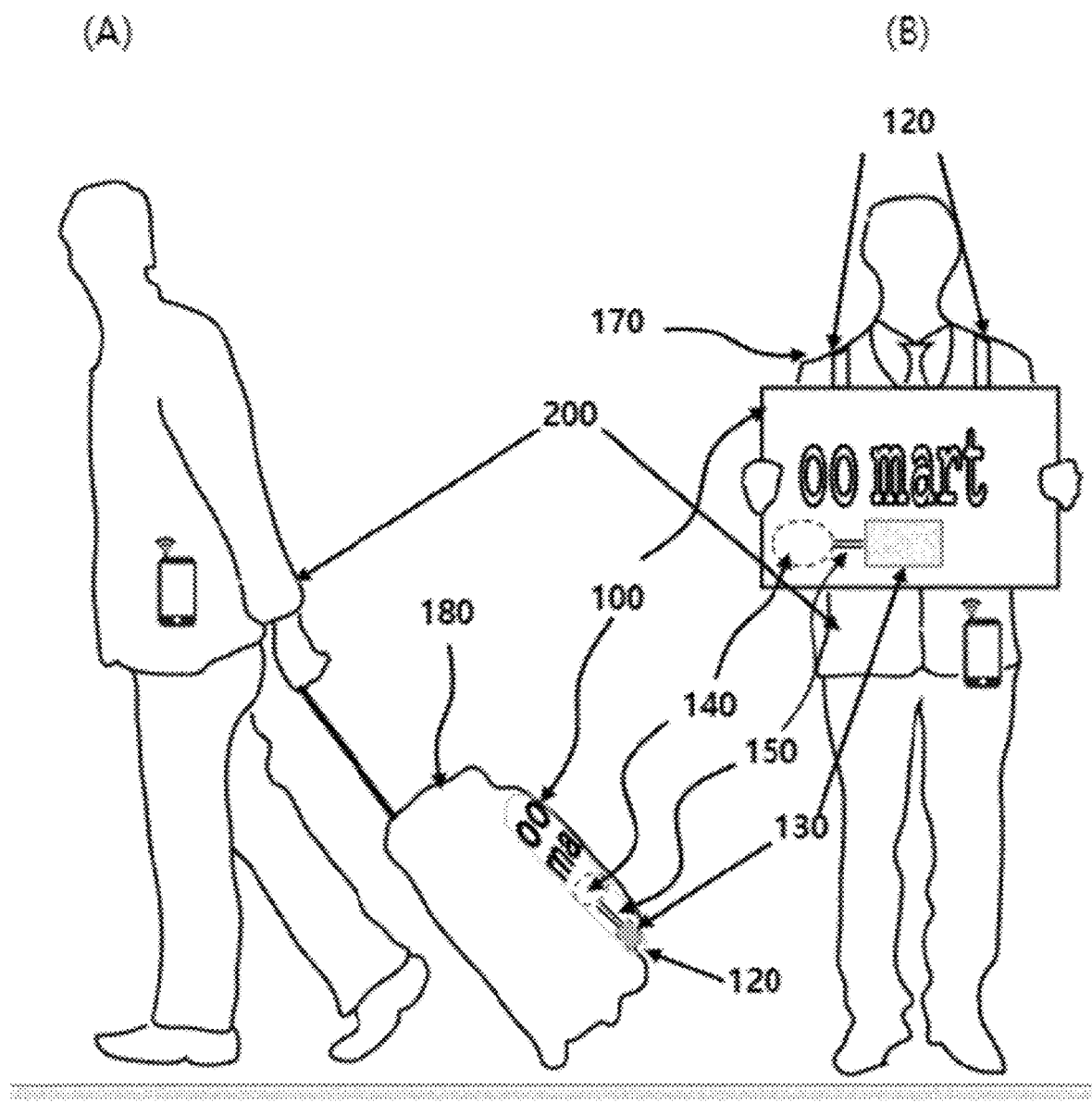
FIG. 5 is a diagram illustrating a moving advertisement apparatus according to a third embodiment of the present invention.

FIG. 5 is a diagram illustrating a mobile advertisement apparatus according to a third embodiment of the present invention. The functions of the elements shown in FIG. 5 are already described above with reference to FIGS. 1-4. Thus, it will not be repeated. The following explanation will be provided with reference to FIG. 5.

FIGS. 5(A) and 5(B) are different from FIGS. 1,2, 3, and 4 in that, in FIG. 5, the housing (100) is mounted on a user's article while, in FIGS. 1, 2, 3, and 4, the housing (100) is mounted on the vehicle (400). Other than that, functions of the elements are the same. In FIG. 5 (A), a bag (180) is shown as an example of a user's article (180). However, the user's article (180) is not limited thereto. The housing (100) is mounted on the user's article (180) through the mounting unit (120). The mounting unit (120) may be provided on one side of the housing (100) of the user's article (180).

The user's article (180) is in possession of a user. The user's article (180) is an essential item to a contemporary person. Thus, while the user moves, the mobile terminal (200) may be located at a close distance from the housing (100), which is mounted on the user's article (180). Thus, a wireless communication is established between the local communication unit (130) installed on the housing (100) and the mobile terminal 200, thereby generating the transmission/reception information.

Referring to FIG. 5(B), the housing (100) is mounted on the body (170) using the mounting unit (120). Most people carry the mobile terminal (200) with them. Thus, while the user possessing the mobile terminal (200) moves, the housing (100) is maintained within a close distance from the mobile terminal (200). Thus, a wireless communication is established between the local communication unit (130) installed on the housing (100) and the mobile terminal 200, thereby generating the transmission/reception information. Street advertising can be an example.

Figure 6:
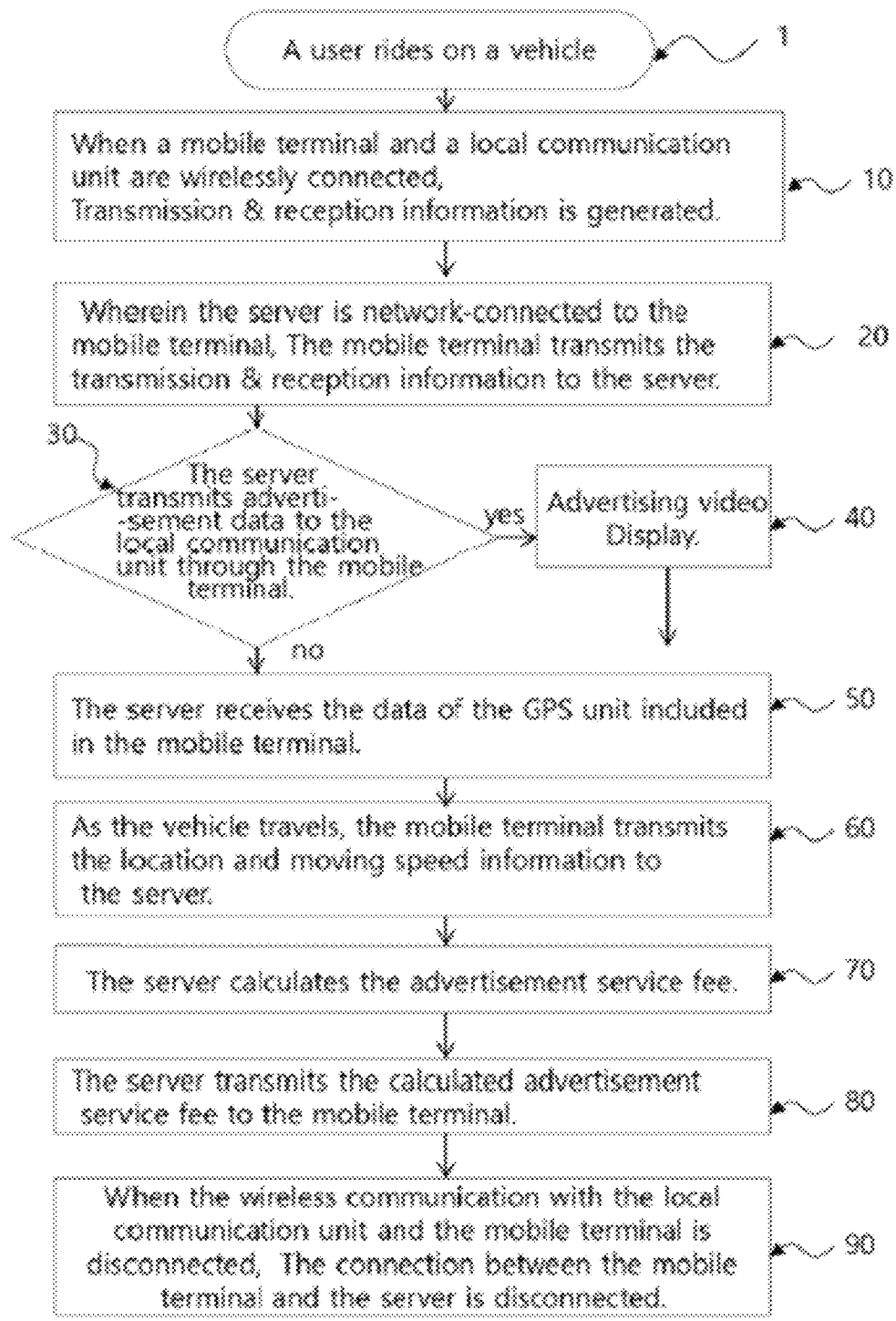
FIG. 6 is a flowchart illustrating a moving advertisement method according to a preferred embodiment.

FIG. 6 is a flowchart illustrating a mobile advertisement method according to a preferred example. Referring to FIG. 6 and FIG. 1, at least one of mobile terminals possessed by a user approaches the housing which is provided with the advertisement display unit capable of exposing an advertisement. See step 1.

As the user approaches closer to the housing (100), which is mounted on the vehicle (400) and equipped with the advertisement display unit, the distance between the local communication unit (130) installed on the housing (100) and the mobile terminal (200) becomes shortened. Thus, a wireless communication is established and the transmission/reception information is generated. See the step 10.

The server transmits the transmission/reception information between the local communication unit (130) and the mobile terminal (200) to the server (300). See the step 20. The server (300) then transmits the advertisement image data to the local communication unit (130) via the mobile terminal (200). See the step 30. The advertisement display unit (110) displays the advertisement. See the step 40.

When there is no device for transmitting the advertisement image data and, instead, a fixed or a semi-permanent advertisement displayer such as a priming material or the like is employed, it is not necessary to transmit the advertisement image data. The server (300) establishes a network connection with the mobile terminal (200) and receives the location and speed information from the GPS unit (210) of the mobile terminal (200). See the step 50.

Then, as the vehicle (400), the user's article (180), or tire user's body (170) moves along with the housing (100) mounted, the location and speed information is generated through the GPS unit (210) of the mobile terminal (200), and the mobile terminal (200) transmits the location speed information to the server (300). See the step 60.

Then, the server (300) calculates the advertisement service fees based on at least one of the transmission/reception information and the location and speed information. The advertisement service fees may be different depending on the location information included in the location and speed information or depending on whether the wireless connection is successful. See the step 70.

The server (300) transmits the advertisement service fees calculated to the mobile terminal (200). See the step 80. When the user leaves the vehicle (400), the network connection between the mobile terminal (200) in possession of the user and the local communication unit (130) is terminated, the network connection between the mobile terminal (200) and the server (300) is terminated. See the step 90.

What is claimed is:
1. An apparatus for moving advertisement comprising:
a housing having an advertisement display unit, wherein the advertisement display unit displays an advertisement;
a mounting unit provided on at least one side of the housing and mounting the housing on at least one of a vehicle, an article, and a body of a user, wherein the user is an advertisement service provider who moves around with carrying the advertisement display unit to expose an advertisement to a viewer;

a local communication unit which is coupled with the housing and wirelessly establishes a first connection for exchanging transmission and reception information with a mobile terminal in possession of the user when the mobile terminal in possession of the user is within a given distance from the housing;

an electric power supply unit coupled with the housing and supplying electric power to at least one of the local communication unit and the advertisement display unit;

a GPS unit provided in the mobile terminal and obtaining location and moving speed information of the mobile terminal; and a server (a) establishing a second connection with the mobile terminal, wherein the second connection is a network connection for receiving (i) the transmission and reception information exchanged between the mobile terminal and the local communication unit and (ii) the location and moving speed information obtained from the GPS unit via the mobile terminal, (b) wherein the second connection is active only when the first connection is maintained active and is terminated when the first connection is disconnected, wherein the server calculates an advertisement service fee based on (1) the information exchanged between the mobile terminal and local communication unit and (2) the location and moving speed information obtained from the GPS unit via the mobile terminal;

wherein the server calculates the advertisement service fee depending on whether or not the first connection between the local communication unit and the mobile terminal is maintained active.

2. The apparatus for moving advertisement of claim 1, further comprising:

a separation preventing unit which disconnects the local communication unit from the mobile terminal when the local communication unit is out of the given distance from the housing.

3. The apparatus for moving advertisement of claim 1, further comprising:

a mounting sensing unit sensing whether the mounting unit is normally operating and informing the local communication unit of whether the mounting unit is normally operating.

4. The apparatus for moving advertisement of claim 1, wherein the server further transmits the advertisement service fee calculated to the mobile terminal of the user.

5. The apparatus for moving advertisement of claim 1, wherein the server transmits advertisement data to the mobile terminal, wherein the mobile terminal transmits the advertisement data to the local communication unit, wherein the advertisement display unit, which is connected to the local communication unit, displays the advertisement.

6. A method for moving advertisement, comprising:

(a) a step of wirelessly establishing a first connection between a mobile terminal and a local communication unit for exchanging transmission and reception information when the mobile terminal in possession of a user is within a given distance from a housing, wherein the housing is provided with an advertisement display unit and the local communication unit, wherein the advertisement display unit is designed to display an advertisement, wherein the user is an advertisement service provider who moves around with carrying the advertisement display unit to expose an advertisement to a viewer;

(b) a step of wirelessly establishing a second connection between the mobile terminal and a server for transmitting from the mobile terminal to the server (i) the transmission and reception information and (ii) location and moving speed information of the mobile terminal, wherein the second connection is a wireless network connection;

(c) a step of transmitting from the mobile terminal to the server (i) the transmission and reception information and (ii) the location and moving speed information, (b) wherein the second connection is active only when the first connection is maintained active and is terminated when the first connection is disconnected, wherein the server calculates an advertisement service fee based on (1) the information exchanged between the mobile terminal and local communication unit and (2) the location and moving speed information obtained from the GPS unit via the mobile terminal;

wherein the server calculates the advertisement service fee depending on whether or not the first connection between the local communication unit and the mobile terminal is maintained active.

7. The method of claim 6, further comprising:

a step of transmitting the advertisement service fee from the server to the mobile terminal of the user.

8. The method of claim 6, further comprising before step (c):

a step of transmitting advertisement image data from the server via the mobile terminal to the local communication unit and displaying the advertisement on the advertisement display unit connected with the local communication unit.

* * * * *